United States Patent
Schmidl et al.

(10) Patent No.: US 11,706,725 B2
(45) Date of Patent: *Jul. 18, 2023

(54) SHORT AND LONG TRAINING FIELDS

(71) Applicant: TEXAS INSTRUMENTS INCORPORATED, Dallas, TX (US)

(72) Inventors: Timothy M. Schmidl, Dallas, TX (US); Anuj Batra, Dallas, TX (US); Srinath Hosur, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/072,232

(22) Filed: Oct. 16, 2020

(65) Prior Publication Data

US 2021/0037491 A1 Feb. 4, 2021

Related U.S. Application Data

(63) Continuation of application No. 16/044,074, filed on Jul. 24, 2018, now Pat. No. 10,813,064, which is a (Continued)

(51) Int. Cl.
*H04W 56/00* (2009.01)
*H04L 27/26* (2006.01)
*H04W 4/80* (2018.01)

(52) U.S. Cl.
CPC ....... *H04W 56/001* (2013.01); *H04L 27/2613* (2013.01); *H04L 27/2634* (2013.01); *H04W 4/80* (2018.02); *H04L 27/26132* (2021.01)

(58) Field of Classification Search
CPC .. H04W 56/001; H04W 4/80; H04L 27/2613; H04L 27/2634
See application file for complete search history.

(56) References Cited

U.S. PATENT DOCUMENTS 7,136,423 B1 11/2006 Duvaut et al.
7,453,793 B1 * 11/2008 Jones, IV ............ H04L 25/0216
370/203

(Continued)

FOREIGN PATENT DOCUMENTS

KR 1020080066122 A 7/2008

OTHER PUBLICATIONS

Xue, Kalyuan, et al., "The Clipping Noise and PAPR in the OFDM System", 2009 International Conference on Communications and Mobile Computing, Jan. 6, 2009, vol. 1, pp. 265-269.

(Continued)

*Primary Examiner* — Donald L Mills
(74) *Attorney, Agent, or Firm* — Mandy Barsilai Fernandez; Frank D. Cimino

(57) ABSTRACT

A method includes receiving a first plurality of symbols comprising complex portions. The method further includes applying conjugate symmetry to the first plurality of symbols, producing a second plurality of symbols comprising no complex portions. The method further includes transforming the second plurality of symbols using an inverse fast Fourier transform, producing a third plurality of symbols. The method further includes interpolating the third plurality of symbols, generating a short training field comprising at least one real portion of the third plurality of symbols, generating a long training field comprising at least one real portion of the third plurality of symbols, and transmitting the short training field and long training field in a WPAN.

25 Claims, 9 Drawing Sheets

Related U.S. Application Data continuation of application No. 14/025,628, filed on Sep. 12, 2013, now Pat. No. 10,034,252, which is a continuation of application No. 12/868,397, filed on Aug. 25, 2010, now Pat. No. 8,553,730.

(60) Provisional application No. 61/287,586, filed on Dec. 17, 2009, provisional application No. 61/238,445, filed on Aug. 31, 2009.

(56) References Cited

U.S. PATENT DOCUMENTS

| | | |
|---|---|---|
| 7,738,538 B1 | 6/2010 | Tung |
| 8,553,730 B2 | 10/2013 | Schmidl et al. |
| 8,576,774 B2 | 11/2013 | Ghosh |
| 8,599,804 B2 | 12/2013 | Erceg et al. |
| 10,034,252 B2 | 7/2018 | Schmidl et al. |
| 10,813,064 B2 * | 10/2020 | Schmidl .............. H04L 27/2634 |
| 2002/0145971 A1 | 10/2002 | Cho et al. |
| 2004/0100897 A1 * | 5/2004 | Shattil ................ H04L 27/2631 370/206 |
| 2004/0141548 A1 * | 7/2004 | Shattil ................ H04L 27/2614 375/146 |
| 2004/0190560 A1 | 9/2004 | Maltsev et al. |
| 2004/0218581 A1 | 11/2004 | Chiara |
| 2005/0174927 A1 | 8/2005 | Stephens et al. |
| 2007/0025392 A1 | 2/2007 | Moorti et al. |
| 2007/0047433 A1 | 3/2007 | Kao |
| 2007/0280098 A1 | 12/2007 | Bhatt et al. |
| 2008/0056393 A1 | 3/2008 | Niu et al. |
| 2009/0109955 A1 * | 4/2009 | Lakkis ..................... H04B 1/69 370/350 |
| 2009/0163143 A1 | 6/2009 | De Rore |
| 2010/0020732 A1 | 1/2010 | Gaddam et al. |
| 2010/0027473 A1 * | 2/2010 | Ghosh ................ H04L 27/2613 370/328 |
| 2010/0290449 A1 | 11/2010 | van Nee et al. |
| 2010/0316094 A1 * | 12/2010 | Tung ................... H04L 25/0224 375/150 |
| 2011/0116565 A1 | 5/2011 | Mujtaba |
| 2011/0194544 A1 | 8/2011 | Yang et al. |
| 2014/0079048 A1 * | 3/2014 | Van Nee .............. H04B 7/0671 370/338 |
| 2015/0124794 A1 | 5/2015 | Hansen et al. |

OTHER PUBLICATIONS

Institute of Electrical and Electronics Engineers. Inc.. "IEEE Standard for Information technology-Telecommunications and information exchange between systems—Local and metropolitan area networks—Specific requirements." Part 15.4: Wireless Medium Access Control (MAC) and Physical Layer (PHY) Specifications for Low-Rate Wireless Personal Area Networks (WPANs), IEEE Std 802.15.4^TM, Sep. 8, 2006, New York, NY.

* cited by examiner

FIG. 1

|     |          | ORIGINAL COMPLEX SEQUENCE | IMPROVED COMPLEX SEQUENCE | QPSK REAL SEQUENCE |
|-----|----------|---------------------------|---------------------------|--------------------|
| LTF | OPTION 1 | 5.6003                    | 3.848                     | 5.2695             |
| LTF | OPTION 2 | 3.1794                    | 3.1636                    | 4.4236             |
| LTF | OPTION 3 | 3.8258                    | 2.3298                    | 4.1538             |
| LTF | OPTION 4 | 5.8345                    | 1.8958                    | 4.1017             |
| LTF | OPTION 5 | 4.2597                    | 2.2462                    | 4.3983             |
| STF | OPTION 1 | 2.2496                    | 2.0708                    | 3.7261             |
| STF | OPTION 2 | 2.2496                    | 2.0615                    | 4.2346             |
| STF | OPTION 3 | 3.4006                    | 2.2462                    | 4.3983             |
| STF | OPTION 4 | 3.4006                    | 2.2462                    | 4.3983             |
| STF | OPTION 5 | 3.0103                    | 3.0103                    | 3.0103             |

FIG. 2

| NUMBER OF OFDM SYMBOLS | | | |
|---|---|---|---|
| 4 | 2 | M | N |
| STF | LTF | PHR | PSDU |
| SHR | | PHR | PHY PAYLOAD |

FIG. 3A

| TONE NUMBER | VALUE | TONE NUMBER | VALUE | TONE NUMBER | VALUE | TONE NUMBER | VALUE |
|---|---|---|---|---|---|---|---|
| -64 | 0 | -32 | -2.9439 | 0 | 0 | 32 | 2.9439 |
| -63 | 0 | -31 | 0 | 1 | 0 | 33 | 0 |
| -62 | 0 | -30 | 0 | 2 | 0 | 34 | 0 |
| -61 | 0 | -29 | 0 | 3 | 0 | 35 | 0 |
| -60 | 0 | -28 | 0 | 4 | 0 | 36 | 0 |
| -59 | 0 | -27 | 0 | 5 | 0 | 37 | 0 |
| -58 | 0 | -26 | 0 | 6 | 0 | 38 | 0 |
| -57 | 0 | -25 | 0 | 7 | 0 | 39 | 0 |
| -56 | 0 | -24 | 2.9439 | 8 | 2.9439 | 40 | -2.9439 |
| -55 | 0 | -23 | 0 | 9 | 0 | 41 | 0 |
| -54 | 0 | -22 | 0 | 10 | 0 | 42 | 0 |
| -53 | 0 | -21 | 0 | 11 | 0 | 43 | 0 |
| -52 | 0 | -20 | 0 | 12 | 0 | 44 | 0 |
| -51 | 0 | -19 | 0 | 13 | 0 | 45 | 0 |
| -50 | 0 | -18 | 0 | 14 | 0 | 46 | 0 |
| -49 | 0 | -17 | 0 | 15 | 0 | 47 | 0 |
| -48 | -2.9439 | -16 | 2.9439 | 16 | -2.9439 | 48 | 2.9439 |
| -47 | 0 | -15 | 0 | 17 | 0 | 49 | 0 |
| -46 | 0 | -14 | 0 | 18 | 0 | 50 | 0 |
| -45 | 0 | -13 | 0 | 19 | 0 | 51 | 0 |
| -44 | 0 | -12 | 0 | 20 | 0 | 52 | 0 |
| -43 | 0 | -11 | 0 | 21 | 0 | 53 | 0 |
| -42 | 0 | -10 | 0 | 22 | 0 | 54 | 0 |
| -41 | 0 | -9 | 0 | 23 | 0 | 55 | 0 |
| -40 | -2.9439 | -8 | 2.9439 | 24 | 2.9439 | 56 | 0 |
| -39 | 0 | -7 | 0 | 25 | 0 | 57 | 0 |
| -38 | 0 | -6 | 0 | 26 | 0 | 58 | 0 |
| -37 | 0 | -5 | 0 | 27 | 0 | 59 | 0 |
| -36 | 0 | -4 | 0 | 28 | 0 | 60 | 0 |
| -35 | 0 | -3 | 0 | 29 | 0 | 61 | 0 |
| -34 | 0 | -2 | 0 | 30 | 0 | 62 | 0 |
| -33 | 0 | -1 | 0 | 31 | 0 | 63 | 0 |

FIG. 3B

| TONE NUMBER | VALUE | TONE NUMBER | VALUE | TONE NUMBER | VALUE | TONE NUMBER | VALUE |
|---|---|---|---|---|---|---|---|
| -32 | 0 | -16 | -2.0817 | 0 | 0 | 16 | 2.0817 |
| -31 | 0 | -15 | 0 | 1 | 0 | 17 | 0 |
| -30 | 0 | -14 | 0 | 2 | 0 | 18 | 0 |
| -29 | 0 | -13 | 0 | 3 | 0 | 19 | 0 |
| -28 | 0 | -12 | 2.0817 | 4 | 2.0817 | 20 | -2.0817 |
| -27 | 0 | -11 | 0 | 5 | 0 | 21 | 0 |
| -26 | 0 | -10 | 0 | 6 | 0 | 22 | 0 |
| -25 | 0 | -9 | 0 | 7 | 0 | 23 | 0 |
| -24 | -2.0817 | -8 | 2.0817 | 8 | -2.0817 | 24 | 2.0817 |
| -23 | 0 | -7 | 0 | 9 | 0 | 25 | 0 |
| -22 | 0 | -6 | 0 | 10 | 0 | 26 | 0 |
| -21 | 0 | -5 | 0 | 11 | 0 | 27 | 0 |
| -20 | -2.0817 | -4 | 2.0817 | 12 | 2.0817 | 28 | 0 |
| -19 | 0 | -3 | 0 | 13 | 0 | 29 | 0 |
| -18 | 0 | -2 | 0 | 14 | 0 | 30 | 0 |
| -17 | 0 | -1 | 0 | 15 | 0 | 31 | 0 |

FIG. 3C

| TONE NUMBER | VALUE | TONE NUMBER | VALUE | TONE NUMBER | VALUE | TONE NUMBER | VALUE |
|---|---|---|---|---|---|---|---|
| -16 | 0 | -8 | 2.0817 | 0 | 0 | 8 | 2.0817 |
| -15 | 0 | -7 | 0 | 1 | 0 | 9 | 0 |
| -14 | 0 | -6 | 0 | 2 | 0 | 10 | 0 |
| -13 | 0 | -5 | 0 | 3 | 0 | 11 | 0 |
| -12 | 2.0817 | -4 | 2.0817 | 4 | -2.0817 | 12 | -2.0817 |
| -11 | 0 | -3 | 0 | 5 | 0 | 13 | 0 |
| -10 | 0 | -2 | 0 | 6 | 0 | 14 | 0 |
| -9 | 0 | -1 | 0 | 7 | 0 | 15 | 0 |

FIG. 3D

| TONE NUMBER | VALUE | TONE NUMBER | VALUE | TONE NUMBER | VALUE | TONE NUMBER | VALUE |
|---|---|---|---|---|---|---|---|
| -8 | 0 | -4 | 1.5275 | 0 | 0 | 4 | 1.5275 |
| -7 | 0 | -3 | 0 | 1 | 0 | 5 | 0 |
| -6 | 1.5275 | -2 | 1.5275 | 2 | -1.5275 | 6 | -1.5275 |
| -5 | 0 | -1 | 0 | 3 | 0 | 7 | 0 |

FIG. 3E

| TONE NUMBER | VALUE | TONE NUMBER | VALUE | TONE NUMBER | VALUE | TONE NUMBER | VALUE |
|---|---|---|---|---|---|---|---|
| -4 | 0 | -2 | 1.7321 | 0 | 0 | 2 | -1.7321 |
| -3 | 0 | -1 | 0 | 1 | 0 | 3 | 0 |

FIG. 3F

| TONE NUMBER | VALUE | TONE NUMBER | VALUE | TONE NUMBER | VALUE | TONE NUMBER | VALUE |
|---|---|---|---|---|---|---|---|
| -64 | 0 | -32 | -1 | 0 | 0 | 32 | -1 |
| -63 | 0 | -31 | -1 | 1 | 1 | 33 | -1 |
| -62 | 0 | -30 | -1 | 2 | -1 | 34 | -1 |
| -61 | 0 | -29 | 1 | 3 | 1 | 35 | 1 |
| -60 | 0 | -28 | 1 | 4 | -1 | 36 | 1 |
| -59 | 0 | -27 | -1 | 5 | 1 | 37 | 1 |
| -58 | 0 | -26 | -1 | 6 | 1 | 38 | 1 |
| -57 | 0 | -25 | -1 | 7 | -1 | 39 | 1 |
| -56 | 0 | -24 | -1 | 8 | -1 | 40 | 1 |
| -55 | 0 | -23 | -1 | 9 | 1 | 41 | -1 |
| -54 | 0 | -22 | 1 | 10 | -1 | 42 | -1 |
| -53 | 0 | -21 | 1 | 11 | 1 | 43 | -1 |
| -52 | -1 | -20 | -1 | 12 | 1 | 44 | -1 |
| -51 | 1 | -19 | 1 | 13 | 1 | 45 | -1 |
| -50 | 1 | -18 | -1 | 14 | 1 | 46 | -1 |
| -49 | -1 | -17 | -1 | 15 | -1 | 47 | 1 |
| -48 | -1 | -16 | 1 | 16 | 1 | 48 | -1 |
| -47 | -1 | -15 | -1 | 17 | 1 | 49 | 1 |
| -46 | -1 | -14 | 1 | 18 | 1 | 50 | 1 |
| -45 | 1 | -13 | 1 | 19 | 1 | 51 | -1 |
| -44 | 1 | -12 | 1 | 20 | 1 | 52 | 1 |
| -43 | -1 | -11 | 1 | 21 | -1 | 53 | 0 |
| -42 | -1 | -10 | -1 | 22 | 1 | 54 | 0 |
| -41 | 1 | -9 | -1 | 23 | -1 | 55 | 0 |
| -40 | 1 | -8 | 1 | 24 | 1 | 56 | 0 |
| -39 | 1 | -7 | 1 | 25 | -1 | 57 | 0 |
| -38 | -1 | -6 | -1 | 26 | 1 | 58 | 0 |
| -37 | -1 | -5 | 1 | 27 | -1 | 59 | 0 |
| -36 | 1 | -4 | 1 | 28 | 1 | 60 | 0 |
| -35 | 1 | -3 | -1 | 29 | 1 | 61 | 0 |
| -34 | -1 | -2 | 1 | 30 | -1 | 62 | 0 |
| -33 | -1 | -1 | 1 | 31 | 1 | 63 | 0 |

FIG. 3G

| TONE NUMBER | VALUE | TONE NUMBER | VALUE | TONE NUMBER | VALUE | TONE NUMBER | VALUE |
|---|---|---|---|---|---|---|---|
| -32 | 0 | -16 | 1 | 0 | 0 | 16 | 1 |
| -31 | 0 | -15 | -1 | 1 | 1 | 17 | -1 |
| -30 | 0 | -14 | 1 | 2 | -1 | 18 | -1 |
| -29 | 0 | -13 | 1 | 3 | 1 | 19 | -1 |
| -28 | 0 | -12 | -1 | 4 | 1 | 20 | -1 |
| -27 | 0 | -11 | -1 | 5 | -1 | 21 | -1 |
| -26 | -1 | -10 | -1 | 6 | 1 | 22 | 1 |
| -25 | -1 | -9 | 1 | 7 | -1 | 23 | -1 |
| -24 | -1 | -8 | 1 | 8 | -1 | 24 | -1 |
| -23 | -1 | -7 | -1 | 9 | 1 | 25 | -1 |
| -22 | 1 | -6 | 1 | 10 | -1 | 26 | 1 |
| -21 | 1 | -5 | 1 | 11 | 1 | 27 | 0 |
| -20 | 1 | -4 | 1 | 12 | 1 | 28 | 0 |
| -19 | -1 | -3 | -1 | 13 | -1 | 29 | 0 |
| -18 | 1 | -2 | -1 | 14 | -1 | 30 | 0 |
| -17 | -1 | -1 | -1 | 15 | 1 | 31 | 0 |

FIG. 3H

| TONE NUMBER | VALUE | TONE NUMBER | VALUE | TONE NUMBER | VALUE | TONE NUMBER | VALUE |
|---|---|---|---|---|---|---|---|
| -16 | 0 | -8 | 1 | 0 | 0 | 8 | -1 |
| -15 | 0 | -7 | 1 | 1 | -1 | 9 | 1 |
| -14 | 0 | -6 | 1 | 2 | -1 | 10 | 1 |
| -13 | 1 | -5 | 1 | 3 | 1 | 11 | -1 |
| -12 | -1 | -4 | 1 | 4 | -1 | 12 | -1 |
| -11 | 1 | -3 | 1 | 5 | 1 | 13 | 1 |
| -10 | -1 | -2 | 1 | 6 | 1 | 14 | 0 |
| -9 | 1 | -1 | -1 | 7 | -1 | 15 | 0 |

FIG. 3I

| TONE NUMBER | VALUE | TONE NUMBER | VALUE | TONE NUMBER | VALUE | TONE NUMBER | VALUE |
|---|---|---|---|---|---|---|---|
| -8 | 0 | -4 | 1 | 0 | 0 | 4 | 1 |
| -7 | 1 | -3 | -1 | 1 | -1 | 5 | -1 |
| -6 | -1 | -2 | 1 | 2 | 1 | 6 | -1 |
| -5 | 1 | -1 | 1 | 3 | 1 | 7 | -1 |

FIG. 3J

| TONE NUMBER | VALUE | TONE NUMBER | VALUE | TONE NUMBER | VALUE | TONE NUMBER | VALUE |
|---|---|---|---|---|---|---|---|
| -4 | 0 | -2 | 1 | 0 | 0 | 2 | 1 |
| -3 | 1 | -1 | 1 | 1 | -1 | 3 | -1 |

SHORT AND LONG TRAINING FIELDS

CROSS-REFERENCE TO RELATED APPLICATION

The present application is a continuation of U.S. patent application Ser. No. 16/044,074, filed Jul. 24, 2018, which is a continuation of U.S. patent application Ser. No. 14/025,628, filed Sep. 12, 2013, now U.S. Pat. No. 10,034,252, which is a continuation of U.S. patent application Ser. No. 12/868,397, filed Aug. 25, 2010, now U.S. Pat. No. 8,553,730, which claims priority to U.S. Provisional Patent Application Nos. 61/238,445, filed on Aug. 31, 2009, and 61/287,586, filed on Dec. 17, 2009, each of which is incorporated herein by reference in its entirety.

BACKGROUND

Wireless personal area networks ("WPANs") are used to convey information over relatively short distances. Unlike wireless local area networks ("WLANs"), WPANs need little or no infrastructure, and WPANS allow small, power-efficient, and inexpensive solutions to be implemented for a wide range of devices. Smart Utility Networks ("SUNs") may operate either over short ranges such as in a mesh network where utility meter information is sent from one utility meter to another or over longer ranges such as in a star topology where utility meter information is sent to a poletop collection point. The terms WPAN and SUN are used interchangeably in this document.

SUMMARY

System and methods for generating short and long training fields for smart utility networks are described herein. In at least some disclosed embodiments, a method includes receiving a first plurality of symbols comprising real portions and complex portions. The method further includes applying conjugate symmetry to the first plurality of symbols, thus producing a second plurality of symbols comprising real portions and no complex portions. The method further includes transforming the second plurality of symbols using an inverse fast Fourier transform, thus producing a third plurality of symbols. The method further includes interpolating the third plurality of symbols, generating a short training field comprising at least one real portion of the third plurality of symbols, generating a long training field comprising at least one real portion of the third plurality of symbols, and transmitting the short training field and long training field in a WPAN.

In other disclosed embodiments, a device includes a processor, a memory coupled to the processor, and an antenna coupled to the processor. The processor generates a packet for use in a WPAN comprising a short training field as part of a synchronization header and a long training field as part of the synchronization header.

In yet other disclosed embodiments, a machine-readable storage medium includes executable instructions that, when executed, cause one or more processors to generate a packet for use in a WPAN comprising a short training field as part of a synchronization header and a long training field as part of the synchronization header.

These and other features and advantages will be more clearly understood from the following detailed description taken in conjunction with the accompanying drawings and claims.

BRIEF DESCRIPTION OF THE DRAWINGS

For a more complete understanding of the present disclosure, reference is now made to the accompanying drawings and detailed description, wherein like reference numerals represent like parts:

FIG. 1 compares peak-to-average power ratios (PAR) in decibels between various sequences of short training fields ("STFs") and long training fields ("LTFs") in accordance with various embodiments;

FIG. 2 illustrates an embodiment of a packet containing a STF and LTF in accordance with various embodiments;

FIGS. 3A-3J illustrate the frequency domain representations of embodiments of STFs and LTFs generated with different inverse fast Fourier transform settings in accordance with various embodiments;

NOTATION AND NOMENCLATURE

Figure 4:
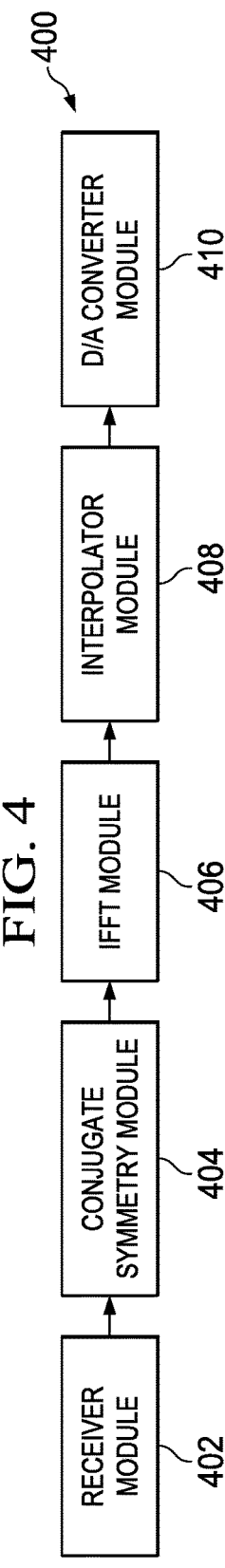
FIG. 4 illustrates generation of STFs and LTFs via modules in accordance with various embodiments.

Certain terms are used throughout the following claims and description to refer to particular components. As one skilled in the art will appreciate, different entities may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean an optical, wireless, indirect electrical, or direct electrical connection. Thus, if a first device couples to a second device, that connection may be through an indirect electrical connection via other devices and connections, through a direct optical connection, etc. Additionally, the term "system" refers to a collection of two or more hardware components, and may be used to refer to an electronic device.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one having ordinary skill in the art will understand that the following description has broad application, and the discussion of any embodiment is meant only to be exemplary of that embodiment, and not intended to intimate that the scope of the disclosure, including the claims, is limited to that embodiment.

A WPAN or low-rate WPAN is a simple, low-cost communication network that allows wireless connectivity in applications with limited power and relaxed throughput requirements. The main objectives of a WPAN are ease of installation, reliable data transfer, short-range operation, extremely low cost, reasonable battery life, and a simple and flexible protocol.

Some characteristics of a WPAN are:
- Over-the-air data rates of 250 kb/s, 100 kb/s, 40 kb/s, and 20 kb/s
- Star or peer-to-peer operation
- Allocated 16-bit short or 64-bit extended addresses
- Optional allocation of guaranteed time slots
- Carrier sense multiple access with collision avoidance channel access
- Low power consumption
- Energy detection
- Link quality indication
- 16 channels in the 2450 MHz band, 30 channels in the 915 MHz band, and 3 channels in the 868 MHz band.

These characteristics are not requirements, and each WPAN may deviate from the characteristics in numerous ways. Two different device types can participate in a WPAN: a full-function device ("FFD") and a reduced-function device ("RFD"). The FFD can operate in three modes serving as a personal area network ("PAN") coordinator or a device. A FFD can talk to RFDs or other FFDs while a RFD can talk only to a FFD. More information can be found at IEEE Std. 802.15.4-2006 available at http://www.ieee802.org/15/pub/TG4.html and hereby incorporated by reference.

A utility network or smart utility network ("SUN") is a low-rate (e.g., 40 kbps to 1 Mbps) low-power WPAN that is specifically designed for use in utility metering applications such as transmitting electric, gas, water usage, and other like data from the customer premises to a data collection point operated by the utility. For example, utility meters are installed for each house in a residential neighborhood, and the usage data is sent periodically from each utility meter to a data collection point, which is an element of the WPAN. The data collection point is connected by fiber, copper wire, or wireless connection to a central office that collects all the usage data for a region. Usage data is sent either directly from each utility meter to the collection point or from utility meter to utility meter until the collection point is reached in a star or network formation, respectively.

This disclosure describes preamble sequences for use in WPAN packets that include a short training field ("STF") and/or a long training field ("LTF") for the orthogonal frequency division multiplexing ("OFDM") physical layer ("PHY"). A STF and LTF are a number of bits in a packet, appearing consecutively in a preamble of the packet in at least one embodiment. In at least one embodiment, the STF has about one quarter the number of non-zero tones as compared to the LTF in order to generate a 4× repetition within the IFFT length. The STF is used by the receiver for automatic gain control settling, packet/boundary detection and/or coarse frequency offset estimation as discussed herein. The LTF is used for fine frequency offset estimation, FFT placement, integer frequency offset estimation, and/or channel estimation as discussed herein. Applicability is not limited to SUNs; rather, the teachings herein may apply to any wireless communication system. In other embodiments, the amount and repetition of the STFs and LTFs vary, and the repetitions may or may not include the cyclic prefix. In the WPAN packets, there are two or more STF OFDM symbols followed by multiple LTF OFDM symbols, the packet header, and the packet payload in at least one embodiment. In other embodiments, the type, order, and number of packet elements vary.

Table 1 illustrates the MCS levels for the 5 options for OFDM block size. Option 1 is generated with a 128 point IFFT, Option 2 is generated with a 64 point IFFT, and Options 3, 4, and 5 use 32, 16, and 8 point IFFTs, respectively.

TABLE 1

Modulation and Coding Schemes for 5 IFFT Sizes
Number of Data Sub-Carriers (NDSC)

| | Option | | | | | | | | | |
|---|---|---|---|---|---|---|---|---|---|---|
| | 1 | | 2 | | 3 | | 4 | | 5 | |
| | 100 | | 48 | | 22 | | 12 | | 4 | |
| MCS | NCBPS | NDBPS | NCBPS | NDBPS | NCBPS | NDBPS | NCBPS | NDBPS | NCBPS | NDBPS |
| 0 | 100 | 12.5 | | | | | | | | |
| 1 | 100 | 25 | 48 | 12 | 22 | 5.5 | | | | |
| 2 | 100 | 50 | 48 | 24 | 22 | 11 | 12 | 6 | | |
| 3 | 100 | 75 | 48 | 36 | 22 | 16.5 | 12 | 9 | | |
| 4 | 200 | 100 | 96 | 48 | 44 | 22 | 24 | 12 | | |
| 5 | 200 | 125 | 96 | 60 | 44 | 27.5 | 24 | 15 | | |
| 6 | | | 96 | 72 | 44 | 33 | 24 | 18 | 8 | 6 |
| 7 | | | 192 | 96 | 88 | 44 | 48 | 24 | 16 | 8 |
| 8 | | | 192 | 120 | 88 | 55 | 48 | 30 | 16 | 10 |
| 9 | | | | | 88 | 66 | 48 | 36 | 16 | 12 |

NCBPS = number of coded bits per symbol,
NDBPS = number of data bits per symbol

Table 2 illustrates alternative MCS levels where the number of data sub-carriers are integer multiples of the number of data sub-carriers for smaller size IFFTs.

TABLE 2

Alternative Modulation and Coding Schemes for 5 IFFT Sizes

Number of Data Sub-Carrier (NDSC)
Option

| | 1 | | | 2 | | | 3 | | | 4 | | | 5 | | |
| | 96 | | | 48 | | | 24 | | | 12 | | | 4 | | |
|---|---|---|---|---|---|---|---|---|---|---|---|---|---|---|---|
| MCS | NCBPS | NDBPS | Rate | NCBPS | NDBPS | Rate | NCBPS | NDBPS | Rate | NCBPS | NDBPS | Rate | NCBPS | NDBPS | Rate |
| 0 | 24 | 12 | 93.75 | | | | | | | | | | | | |
| 1 | 48 | 24 | 187.5 | 24 | 12 | 93.75 | 12 | 6 | 46.88 | | | | | | |
| 2 | 96 | 48 | 375 | 48 | 24 | 187.5 | 24 | 12 | 93.75 | 12 | 6 | 46.88 | | | |
| 3 | 96 | 72 | 562.5 | 48 | 36 | 281.25 | 24 | 18 | 140.63 | 12 | 9 | 70.31 | | | |
| 4 | 192 | 96 | 750 | 96 | 48 | 375 | 48 | 24 | 187.5 | 24 | 12 | 93.75 | | | |
| 5 | 192 | 120 | 937.5 | 96 | 60 | 468.75 | 48 | 30 | 234.38 | 24 | 15 | 117.19 | | | |
| 6 | | | | 96 | 72 | 562.5 | 48 | 36 | 281.25 | 24 | 18 | 140.63 | 8 | 6 | 46.88 |
| 7 | | | | 192 | 96 | 750 | 96 | 48 | 375 | 48 | 24 | 187.5 | 16 | 8 | 62.5 |
| 8 | | | | 192 | 120 | 937.5 | 96 | 60 | 468.75 | 48 | 30 | 234.38 | 16 | 10 | 78.13 |
| 9 | | | | | | | 96 | 72 | 562.5 | 48 | 36 | 281.25 | 16 | 12 | 93.75 |

The STFs and LTFs sequences discussed below have low peak-to-average power ratios ("PARs"). In addition to providing packets generated using these STFs and LTFs with low PARs: 1) ensure that the transmitter will not be clipped, therefore ensuring a good error vector magnitude ("EVM") for the preamble and the channel estimation sequence; 2) allow for boosts to the power of the preamble without clipping; and 3) allow for better preamble range for increased robustness in the system.

OFDM is a modulation technique that can be used for the physical layer of the SUN. Some examples of complex OFDM LTF sequences are shown below. Option 1 is generated using a 128 point inverse fast Fourier transform ("IFFT") at the Nyquist rate, Option 2 is generated using a 64 point IFFT, and Options 3, 4, and 5 are generated using 32, 16, and 8 point IFFTs, respectively.

LTF_freq(Option-1)=[0, 1,−1, 1,−1, 1, 1,−1,−1, 1,−1, 1, 1, 1, 1,−1, 1, 1, 1, 1, 1,−1, 1,−1, 1, −1, 1,−1, 1, 1,−1, 1,−1,− 1,−1, 1, 1, 1, 1, 1, 1,−1,−1,−1,−1,−1,−1, 1,−1, 1, 1,−1, 1, zeros(1,23), −1, 1, 1,−1,−1,−1,−1, 1, 1,−1,−1, 1, 1, 1,−1,−1, 1, 1,−1,−1,−1,−1, 1, 1,−1,−1,−1,−1,−1, 1, 1,−1, 1,−1,−1, 1,−1, 1, 1, 1, 1,−1,−1, 1, 1,−1, 1, 1,−1, 1, 1].

LTF_freq(Option-2)=[0, 1,−1, 1, 1,−1, 1,−1,−1, 1,−1, 1, 1,−1,−1, 1, 1,−1,−1,−1,−1,−1, 1,−1,−1,−1, 1, zeros(1,11), −1,−1,−1,−1,−1, 1, 1, 1,−1, 1,−1, 1,−1, 1, 1, 1,−1,−1,−1, 1, 1,−1, 1, 1, 1,−1,−1,−1].

LTF_freq(Option-3)=[0, −1,−1, 1,−1, 1, 1,−1,−1, 1, 1,−1,−1, 1, zeros(1,5), 1,−1, 1,−1, 1, 1, 1, 1, 1, 1, 1, 1,−1].

LTF_freq(Option-4)=[0, −1, 1, 1, 1,−1,−1,−1, 0, 1,−1, 1, 1,−1, 1, 1].

LTF_freq(Option-5)=[0, −1, 1,−1, 0, 1, 1, 1].

These sequences are given in Matlab format. For Option 5, the first 0 represents the DC tone, which is not used. The next three subcarriers are 1, 2, and 3 with data −1, 1, −1, respectively. The negative subcarriers −4, −3, −2, −1 have data 0, 1, 1, 1, respectively. In general, if there are N subcarriers, the Matlab subcarrier numbering is 0, 1, 2, 3, . . . , (N/2)−1 followed by −(N/2), . . . , −3, −2, −1.

Some examples of complex STF sequences are shown below.

STF_freq(Option-1)=sqrt(104/24)*[0, 0, 0, 0,−1, 0, 0, 0,−1, 0, 0, 0, 1, 0, 0, 0, 1, 0, 0, 0, 1, 0, 0, 0,−1, 0, 0, 0, 1, 0, 0, 0,−1, 0, 0, 0, 1, 0, 0, 0,−1, 0, 0, 0, 1, 0, 0, 0,−1, 0, 0, 0, 1, 0, 0, 0,−1, 0, 0, 0, 0, 0, 0, 0, 0, 0, 0, 0, 0, 0, 0, 0, 0, 0, 0, 0, 0, 0, 0, 0, 0, 0, 0,−1, 0, 0, 0,−1, 0, 0, 0,−1, 0, 0, 0,−1, 0, 0, 0,−1, 0, 0, 0,−1, 0, 0, 0, 1, 0, 0, 0, 1, 0, 0, 0,−1, 0, 0, 0, 1, 0, 0, 0, 0,−1, 0, 0, 0].

STF_freq(Option-2)=sqrt(52/12)*[0, 0, 0, 0, 1, 0, 0, 0,−1, 0, 0, 0, 1, 0, 0, 0, 1, 0, 0, 0,−1, 0, 0, 0, 1, 0, 0, 0, 0, 0, 0, 0, 0, 0, 0, 0,−1, 0, 0, 0,−1, 0, 0, 0,−1, 0, 0, 0, 1, 0, 0, 1, 0, 0, 0, 1, 0, 0, 0].

STF_freq(Option-3)=sqrt(26/6)*[0, 0, 0, 0,−1, 0, 0, 0, 1, 0, 0,−1, 0, 0, 0, 0, 0, 0, 1, 0, 0, 0, 1, 0, 0, 0, 1, 0, 0, 0].

STF_freq(Option-4)=sqrt(14/6)*[0, 0,−1, 0, 1, 0,−1, 0, 0, 0, 1, 0, 1, 0, 1, 0].

STF_freq(Option-5)=sqrt(6/2)*[0, 0,−1, 0, 0, 0, 1, 0].

Using these sequences, PAR can be reduced significantly as shown in the example of FIG. 1. Specifically, the first column identifies the LTF and STF sequences. The second column identifies the IFFT options used. The third column lists the PAR for communication without STFs or LTFs optimized for PAR. The fourth column lists the PAR for communication using optimized STFs and LTFs. The fifth column lists the PAR for communication using quadrature phase shift keying ("QPSK") modulation.

Some examples of alternative LTF sequences are shown below. These sequences are given in Matlab format. For Option 5, the first 0 represents the DC tone, which is not used. The next three subcarriers are 1, 2, and 3. In general, if there are N subcarriers, the Matlab subcarrier numbering is 0, 1, 2, 3, . . . , (N/2)−1 followed by −(N/2), . . . , −3, −2, −1.

LTF alternatives for option 4:
ltfr4=0 −1 −1 1 −1 −1 1 −1 0 1 1 1 −1 −1 −1 1
ltfr4=0 −1 1 1 1 −1 −1 −1 0 1 −1 1 1 −1 1 1
ltfr4=0 1 −1 −1 −1 1 1 1 0 −1 1 −1 −1 1 −1 −1
ltfr4=0 1 1 −1 1 1 −1 1 0 −1 −1 −1 1 1 1 −1.

LTF alternatives for option 5:
ltfr5=0 −1 −1 −1 0 1 −1 1
ltfr5=0 −1 1 1 −1 0 1 1 1
ltfr5=0 1 −1 1 0 −1 −1 −1
ltfr5=0 1 1 1 0 −1 1 −1
ltfr5=0 −1 −1 −1 −1 1 1 −1
ltfr5=0 −1 1 −1 1 1 −1 1
ltfr5=0 1 −1 1 −1 −1 1 1
ltfr5=0 1 1 1 1 −1 −1 1 1.

Some examples of alternative STF sequences are shown below. These sequences are given in Matlab format. For Option 5, the first 0 represents the DC tone, which is not used. The next three subcarriers are 1, 2, and 3. In general, if there are N subcarriers, the Matlab subcarrier numbering is 0, 1, 2, 3, . . . , (N/2)−1 followed by −(N/2), . . . , −3, −2, −1.

STF Alternatives for Option 2:
stfr2=0 0 0 0 -1 0 0 0 -1 0 0 0 -1 0 0 0 1 0 0 0 1 0 0 0 1 0 0 0 0 0 0 0 0 0 0 0 0 0 0 0 0 -1 0 0 0 1 0 0 0 -1 0 0 0 -1 0 0 0 1 0 0 0 -1 0 0 0 stfr2=0 0 0 0 -1 0 0 0 1 0 0 0 -1 0 0 0 -1 0 0 0 1 0 0 0 -1 0 0 0 0 0 0 0 0 0 0 0 0 0 0 0 0 0 1 0 0 0 1 0 0 0 1 0 0 0 -1 0 0 0 -1 0 0 0 -1 0 0 0 stfr2=0 0 0 1 0 0 0 -1 0 0 0 1 0 0 1 0 0 0 -1 0 0 0 1 0 0 0 0 0 0 0 0 0 0 0 0 0 0 0 0 0 0 -1 0 0 0 -1 0 0 0 -1 0 0 0 1 0 0 0 1 0 0 0 1 0 0 0 stfr2=0 0 0 1 0 0 0 1 0 0 0 1 0 0 0 -1 0 0 0 -1 0 0 0 -1 0 0 0 0 0 0 0 0 0 0 0 0 0 0 0 0 0 1 0 0 0 -1 0 0 0 1 0 0 0 1 0 0 0 -1 0 0 0 1 0 0 0.

STF Alternatives for Option 3:
stfr3=0 0 0 0 -1 0 0 0 -1 0 0 0 -1 0 0 0 0 0 0 0 1 0 0 0 -1 0 0 0 1 0 0 0 stfr3=0 0 0 0 -1 0 0 0 1 0 0 0 -1 0 0 0 0 0 0 0 1 0 0 0 1 0 0 0 1 0 0 0 stfr3=0 0 0 0 1 0 0 0 -1 0 0 0 1 0 0 0 0 0 0 0 0 -1 0 0 0 -1 0 0 0 1 0 0 0 stfr3=0 0 0 0 1 0 0 0 1 0 0 0 1 0 0 0 0 0 0 0 0 -1 0 0 0 1 0 0 0 -1 0 0 0.

STF Alternatives for Option 4:
stfr4=0 0 -1 0 -1 0 -1 0 0 0 1 0 -1 0 1 0 stfr4=0 0 -1 0 1 0 -1 0 0 0 1 0 1 0 1 0 stfr4=0 0 1 0 -1 0 1 0 0 0 -1 0 -1 0 -1 0 stfr4=0 0 1 0 1 0 1 0 0 0 -1 0 1 0 -1 0.

STF Alternatives for Option 5:
stfr5=0 0 -1 0 0 0 -1 0 stfr5=0 0 -1 0 0 0 1 0 stfr5=0 0 1 0 0 0 -1 0 stfr5=0 0 1 0 0 0 1 0.

FIG. 2 illustrates a packet format using STFs and LTFs in at least one embodiment. A synchronization header ("SHR") comprises a STF and LTF. As illustrated, the STF and LTF are four and two symbols long respectively, but each can be any size in various embodiments. The STF allows a device to perform automatic gain control ("AGC"), packet detection, de-assertion of clear channel assessment ("CCA") based on CCA modes (CCA Mode 1, 2, or 3), and coarse synchronization. The LTF allows a device to perform fine synchronization and perform channel estimation. The packet header ("PHR") can be any number of data symbols or bits "M." In at least one embodiment, the PHR contains:

A Rate field specifying the data rate of the payload frame (5 bits);

One reserved bit after the Rate field;

A Frame Length field specifying the length of the payload (11 bits);

Two reserved bits after the Frame Length field;

A Scrambler field specifying the scrambling seed (2 bits);

One reserved bit after the Scrambler field;

A Header Check Sequence ("HCS") 8-bit CRC taken over the data fields only; and

Six tail bits, which are all zeros, for Viterbi decoder flushing.

The PHR is encoded at the lowest data rate supported for each bandwidth option in at least one embodiment. The physical layer convergence protocol service data unit ("PSDU"), which can be any number of data symbols or bits "N," carries a media access control ("MAC") sublayer frame, which comprises a MAC header, MAC payload, and MAC cyclic redundancy check ("CRC") in at least one embodiment. The PSDU also carries convolutional encoder tail-bits, which can be six zeros, and pad-bits to extend the data to fill an integer number of OFDM symbols.

For OFDM, the STF and LTF fields comprise the preamble. Various embodiments for the STF and LTF for the five options are defined by FIGS. 3A-3J. These figures correspond to the Improved Complex Sequence column in FIG. 1. FIG. 3A shows the frequency domain representation of the STF for Option 1. The scaling factor used in the figure is sqrt(104/12). However, various scaling factors are used in various other embodiments, and the scaling factor can be changed to obtain a desired signal level FIG. 3B shows the frequency domain representation of the STF for Option 2. The scaling factor used in the figure is sqrt(52/12). FIG. 3C shows the frequency domain representation of the STF for Option 3. The scaling factor used in the figure is sqrt(26/6). FIG. 3D shows the frequency domain representation of the STF for Option 4. The scaling factor used in the figure is sqrt(14/6). FIG. 3E shows the frequency domain representation of the STF for Option 5. The scaling factor used in the figure is sqrt(6/2).

LTFs for the five scalable bandwidth OFDM options are defined in FIGS. 3F-3J. FIG. 3F shows the frequency domain representation of the LTF for Option 1. FIG. 3G shows the frequency domain representation of the LTF for Option 2. Similarly, FIGS. 3H-I show the frequency domain representations of the LTFs for Options 3-5.

FIG. 4 illustrates modules 400 or logic in a device for receiving, generating, and transmitting the STFs and LTFs. The device sends and receives packets in a WPAN as part of a SUN in at least one embodiment. The device preferably comprises a processor, an antenna coupled to the processor, and memory coupled to the processor. At 402, packets are received, and the packets contain data symbols that may be binary phase shift keyed ("BPSK") (−1−j and 1+j), rotated BPSK (−1 and 1), QPSK (−1−j, −1+j, 1−j, and 1+j), or rotated QPSK (−1, 1, −j, and j).

At 404, conjugate symmetry may be applied to the symbols in the frequency domain, thus producing a real signal in the time domain (i.e. no complex portion to the signal). At a transmitter, this real sequence only requires one digital to analog converter ("DAC") because there is no complex portion to be processed. DCM can also be used for the header to provide frequency diversity. In an alternative embodiment, a complex module or logic is turned off or run at reduced power, and the total power necessary to operate the device is reduced. In an alternative embodiment, the conjugate symmetry may be omitted so that a complex STF and LTF is produced.

At 406, the IFFT converts the symbols to a time domain sequence. In at least one embodiment, the STF and LTF can be generated offline using the IFFT to form time domain sequences, and these can be stored and used in the device. The Time-Domain STF for Option-n (n=1,2,3,4,5) is obtained as follows:

STF_time(Option-n)=IFFT(STF_freq(Option-n)).

The time-domain STF is repeated to fill four OFDM symbols with the last ¼ symbol repetition negated before transmission in at least one embodiment. In other embodiments, the size of the STF and the size of the negated portion vary.

The Time-Domain LTF for Option-n (n=1,2,3,4,5) is obtained as follows:

LTF_time(Option-n)=IFFT(LTF_freq(Option-n)).

In at least one embodiment, the time-domain LTF is repeated to fill two OFDM symbols before transmission. In other embodiments, the size of the LTF varies.

Figure 5:
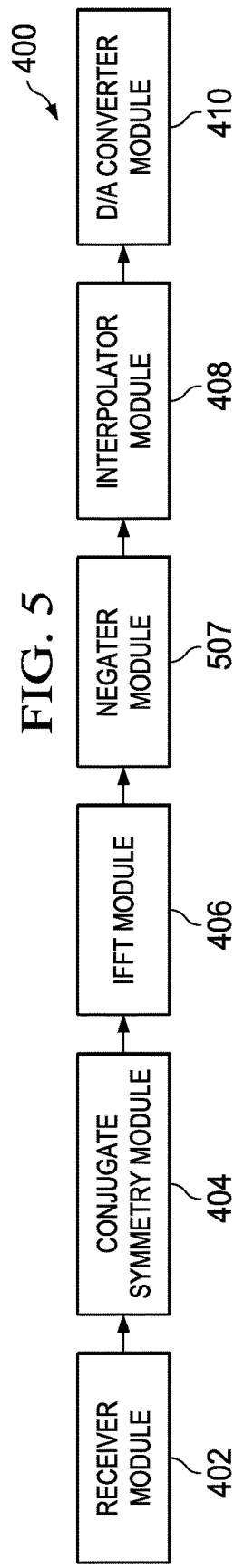
FIG. 5 illustrations generation of STFs via modules in accordance with various embodiments.

At 408, frequency domain interpolation is performed by inserting extra zeros after the positive sub-carriers. Alternatively, a time-domain interpolator can be used to generate an oversampled signal at a transmitter. The interpolation is part of the IFFT in at least one embodiment. At 410, a DAC converts signals from digital to analog in preparation for transmittal. In another embodiment, as shown in FIG. 5, the last repetition in the STF is negated at 507. Specifically, the STF comprises a group of bits that are repeated. In such an embodiment, the last group of bits is negated.

The receiving device implements a correlator to search for the preamble in at least one embodiment. The correlation is performed using the known transmitted preamble at the device. In another embodiment, the device performs a delayed correlation by storing the received signal in memory, and correlating a delayed version of the preamble with a non-delayed version. For example, if the preamble repeats every 128 samples, then the delay can be set to 128 samples. In addition, the phase rotation at the peak correlation provides an estimate of the carrier-frequency offset.

For each of the 5 options, both a short and long training field can be defined. For Option 5 with an IFFT size of 8, the STF can be defined in the frequency domain as:

[0 0 −1 0 0 0 −1 0].

The corresponding sub-carriers are given below.

DC 1 2 3 −4 −3 −2 −1.

Applying the IFFT results in:

[−0.2500 0 0.2500 0 −0.2500 0 0.2500 0].

At the transmitter, interpolation occurs to at least four times the sample rate in at least one embodiment. This interpolation can occur as part of the IFFT or after the IFFT. For example, 24 zeros are inserted after the highest positive frequency before taking the IFFT as shown below.

4*IFFT([0 0 −1 0 zeros(1,24) 0 0 −1 0]=[−0.2500 −0.2310 −0.1768 −0.0957 0 0.0957 0.1768 0.2310 0.2500 0.2310 0.1768 0.0957 0 −0.0957 −0.1768 −0.2310 −0.2500 −0.2310 −0.1768 −0.0957 0 0.0957 0.1768 0.2310 0.2500 0.2310 0.1768 0.0957 0 −0.0957 −0.1768 −0.2310].

These sequences are given in Matlab format. For Option 5, the first 0 represents the DC tone, which is not used. The next three subcarriers are 1, 2, and 3. In general, if there are N subcarriers, the Matlab subcarrier numbering is 0, 1, 2, 3, . . . , (N/2)−1 followed by −(N/2), . . . , −3, −2, −1. For Option 5 with an IFFT size of 8, the STF can be defined in the frequency domain as:

Option 5: PAR=3.0103 dB

[0 0 −1 0 0 0 −1 0]

[0 0 1 0 0 0 1 0].

For Option 4, the STF can be defined in the frequency domain as:

Option 4: PAR=4.3983 dB

[0 0 −1 0 −1 0 1 0 0 0 1 0 −1 0 −1 0]

[0 0 −1 0 1 0 1 0 0 0 1 0 1 0 −1 0]

[0 0 1 0 −1 0 −1 0 0 0 −1 0 −1 0 1 0]

[0 0 1 0 1 0 −1 0 0 0 −1 0 1 0 1 0].

For Option 3, the STF can be defined in the frequency domain as:

Option 3: PAR=4.3983 dB

[0 0 0 0 −1 0 0 0 −1 0 0 0 1 0 0 0 0 0 0 0 1 0 0 0 −1 0 0 0 0 −1 0 0 0]

[0 0 0 0 −1 0 0 0 1 0 0 0 1 0 0 0 0 0 0 0 1 0 0 0 1 0 0 0 −1 0 0 0]

[0 0 0 0 1 0 0 0 −1 0 0 0 −1 0 0 0 0 0 0 0 −1 0 0 0 −1 0 0 0 1 0 0 0]

[0 0 0 0 1 0 0 0 1 0 0 0 −1 0 0 0 0 0 0 0 −1 0 0 0 1 0 0 0 1 0 0 0].

For Option 2, the STF can be defined in the frequency domain as:

Option 2: PAR=5.0685 dB

[0 0 0 0 −1 0 0 0 −1 0 0 0 −1 0 0 0 −1 0 0 0 1 0 0 0 1 0 0 0 0 0 0 0 0 0 0 0 0 0 0 0 1 0 0 0 1 0 0 0 −1 0 0 0 −1 0 0 0 −1 0 0 0 −1 0 0 0]

[0 0 0 0 −1 0 0 0 1 0 0 0 −1 0 0 0 1 0 0 0 1 0 0 0 −1 0 0 0 0 0 0 0 0 0 0 0 0 0 0 0 −1 0 0 0 1 0 0 0 1 0 0 0 −1 0 0 0 1 0 0 0 −1 0 0 0]

[0 0 0 0 1 0 0 0 −1 0 0 0 1 0 0 0 −1 0 0 0 −1 0 0 0 1 0 0 0 0 0 0 0 0 0 0 0 0 0 0 0 1 0 0 0 −1 0 0 0 −1 0 0 0 1 0 0 0 −1 0 0 0 1 0 0 0]

[0 0 0 0 1 0 0 0 1 0 0 0 1 0 0 0 1 0 0 0 −1 0 0 0 −1 0 0 0 0 0 0 0 0 0 0 0 0 0 0 0 −1 0 0 0 −1 0 0 0 1 0 0 0 1 0 0 0 1 0 0 0 1 0 0 0].

These sequences are given in Matlab format. For Option 5, the first 0 represents the DC tone, which is not used. The next three subcarriers are 1, 2, and 3. In general, if there are N subcarriers, the Matlab subcarrier numbering is 0, 1, 2, 3, . . . , (N/2)−1 followed by −(N/2), . . . , −3, −2, −1. For Option 1, the STF can be defined in the frequency domain as:

Option 1: PAR=4.4012 dB

[0 0 0 0 −1 0 0 0 −1 0 0 0 1 0 0 0 −1 0 0 0 −1 0 0 0 1 0 0 0 −1 0 0 0 −1 0 0 0 1 0 0 0 1 0 0 0 1 0 0 0 0 0 0 0 0 0 0 0 0 0 0 0 0 0 0 0 0 0 0 0 0 0 0 0 0 0 0 0 0 0 0 0 0 0 1 0 0 0 0 1 0 0 0 1 0 0 0 −1 0 0 0 −1 0 0 0 −1 0 0 0 1 0 0 0 −1 0 0 0 −1 0 0 0 1 0 0 0 −1 0 0 0 −1 0 0 0]

[0 0 0 0 −1 0 0 0 1 0 0 0 1 0 0 0 1 0 0 0 −1 0 0 0 −1 0 0 0 1 0 0 0 0 −1 0 0 0 1 0 0 0 −1 0 0 0 −1 0 0 0 1 0 0 0 −1 0 0 0 0 0 0 0 0 0 0 0 0 0 0 0 0 0 0 0 0 0 0 0 0 0 0 0 0 0 0 0 0 0 −1 0 0 0 1 0 0 0 −1 0 0 0 −1 0 0 0 1 0 0 0 −1 0 0 0 −1 0 0 0 −1 0 0 0 1 0 0 0 1 0 0 0 1 0 0 0 −1 0 0 0]

[0 0 0 0 1 0 0 0 −1 0 0 0 −1 0 0 0 −1 0 0 0 1 0 0 0 0 1 0 0 0 −1 0 0 0 1 0 0 0 1 0 0 0 −1 0 0 0 1 0 0 0 0 0 0 0 0 0 0 0 0 0 0 0 0 0 0 0 0 0 0 0 0 0 0 0 0 0 0 0 0 0 0 0 0 0 0 0 0 0 1 0 0 0 0 −1 0 0 0 1 0 0 0 −1 0 0 0 1 0 0 0 1 0 0 0 1 0 0 0 0 −1 0 0 0 −1 0 0 0 −1 0 0 0 1 0 0 0]

[0 0 0 0 1 0 0 0 1 0 0 0 −1 0 0 0 1 0 0 0 1 0 0 0 1 0 0 0 −1 0 0 0 −1 0 0 0 1 0 0 0 −1 0 0 0 −1 0 0 0 1 0 0 0 0 0 0 0 0 0 0 0 0 0 0 0 0 0 0 0 0 0 0 0 0 0 0 0 −1 0 0 0 −1 0 0 0 1 0 0 0 0 1 0 0 0 1 0 0 0 −1 0 0 0 1 0 0 0 0 0 1 0 0 0 −1 0 0 0 1 0 0 0 1 0 0 0].

In at least one embodiment, the STF can be designed using rotated QPSK symbols. In another embodiment, the STF can be designed using rotated BPSK symbols. By having freedom in the design of the sequences, the PAR can be lowered for Option 1 and 2 easily on a case-by-case basis.

These sequences are given in Matlab format. For Option 5, the first 0 represents the DC tone, which is not used. The next three subcarriers are 1, 2, and 3. In general, if there are N subcarriers, the Matlab subcarrier numbering is 0, 1, 2, 3, . . . , (N/2)−1 followed by −(N/2), . . . , −3, −2, −1. An example of STFs using QPSK are:

Option 5: PAR=3.0103 dB

[0 0 −j 0 0 0 j 0]

[0 0 j 0 0 0 −j 0];

Option 4: PAR=4.3983 dB

In addition to the 4 sequences for BPSK,

[0 0 −j 0 −1 0 −j 0 0 0 j 0 −1 0 j 0]

[0 0 −j 0 1 0 −j 0 0 0 j 0 1 0 j 0]

[0 0 j 0 −1 0 j 0 0 0 −j 0 −1 0 −j 0]

[0 0 j 0 1 0 j 0 0 0 −j 0 1 0 −j 0];

Option 3: PAR=4.3983 dB

[0 0 0 0 −j 0 0 0 −1 0 0 0 −j 0 0 0 0 0 0 0 j 0 0 0 −1 0 0 0 0 j 0 0 0]

[0 0 0 0 −j 0 0 0 1 0 0 0 −j 0 0 0 0 0 0 0 j 0 0 0 1 0 0 0 j 0 0 0]

[0 0 0 0 j 0 0 0 −1 0 0 0 j 0 0 0 0 0 0 0 −j 0 0 0 −1 0 0 0 −j 0 0 0]

[0 0 0 0 j 0 0 0 1 0 0 0 j 0 0 0 0 0 0 0 −j 0 0 0 1 0 0 0 −j 0 0 0];

Option 2: PAR=4.2346 dB

[0 0 0 0 −1 0 0 0 −j 0 0 0 1 0 0 0 j 0 0 0 1 0 0 0 −j 0 0 0 0 0 0 0 0 0 0 0 j 0 0 0 1 0 0 0 −j 0 0 0 1 0 0 0 j 0 0 0 −1 0 0 0]

[0 0 0 0 −1 0 0 0 j 0 0 0 1 0 0 0 −j 0 0 0 1 0 0 0 j 0 0 0 0 0 0 0 0 0 0 0 −j 0 0 0 1 0 0 0 j 0 0 0 1 0 0 0 −j 0 0 0 −1 0 0 0]

[0 0 0 0 1 0 0 0 −j 0 0 0 −1 0 0 0 j 0 0 0 −1 0 0 0 −j 0 0 0 0 0 0 0 0 0 0 0 j 0 0 0 −1 0 0 0 −j 0 0 0 −1 0 0 j 0 0 0 1 0 0 0]

[0 0 0 0 1 0 0 0 j 0 0 0 −1 0 0 0 −j 0 0 0 −1 0 0 0 j 0 0 0 0 0 0 0 0 0 0 0 −j 0 0 0 −1 0 0 0 j 0 0 0 −1 0 0 0 −j 0 0 0 1 0 0 0]

[0 0 0 0 j 0 0 0 j 0 0 0 j 0 0 0 −j 0 0 0 j 0 0 0 j 0 0 0 0 0 0 0 0 0 0 0 0 j 0 0 0 −j 0 0 0 j 0 0 0 j 0 0 0 j 0 0 0 j 0 0 0]

[0 0 0 0 −j 0 0 0 j 0 0 0 −j 0 0 0 j 0 0 0 j 0 0 0 j 0 0 0 0 0 0 0 0 0 0 0 0 0 j 0 0 0 −j 0 0 0 −j 0 0 0 j 0 0 0 −j 0 0 0 j 0 0 0]

[0 0 0 0 j 0 0 0 −j 0 0 0 j 0 0 0 −j 0 0 0 −j 0 0 0 −j 0 0 0 0 0 0 0 0 0 0 0 0 j 0 0 0 j 0 0 0 j 0 0 0 −j 0 0 0 j 0 0 0 −j 0 0 0]

[0 0 0 0 j 0 0 0 j 0 0 0 j 0 0 0 j0 0 0 j 0 0 0 j 0 0 0 0 0 0 0 0 0 0 0 0 −j 0 0 0 j 0 0 0 −j 0 0 0 −j 0 0 0 −j 0 0 0 −j 0 0 0]; and Option 1: PAR=3.7261 dB

[0 0 0 0 j 0 0 0 −j 0 0 0 −j 0 0 0 j 0 0 0 j 0 0 0 −j 0 0 0 j 0 0 0 j 0 0 0 j 0 0 0 j 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 0 −j 0 0 0 −j 0 0 0 −j 0 0 0 −j 0 0 0 j 0 0 0 −j 0 0 0 j 0 0 0 j 0 0 0 −j 0 0 0 j 0 0 0 j 0 0 0 j 0 0 0 j 0 0 0 −j 0 0 0].

These sequences are given in Matlab format. For Option 5, the first 0 represents the DC tone, which is not used. The next three subcarriers are 1, 2, and 3. In general, if there are N subcarriers, the Matlab subcarrier numbering is 0, 1, 2, 3, . . . , (N/2)−1 followed by −(N/2), . . . , −3, −2, −1. Some examples of LTFs using a rotated BPSK are:

Option 5: PAR=4.3983 dB
[0 −1 −1 1 0 1 −1 −1]
[0 −1 1 1 0 1 1 −1]
[0 1 −1 −1 0 −1 −1 1]
[0 1 1 −1 0 −1 1 1];

Option 4: PAR=4.1017 dB
[0 −1 −1 −1 1 1 −1 1 0 1 −1 1 1 −1 −1 −1]
[0 −1 1 −1 −1 1 1 1 0 1 1 1 −1 −1 1 −1]
[0 1 −1 1 1 −1 −1 −1 0 −1 −1 −1 1 1 1 −1 1 1]
[0 1 1 1 −1 −1 1 −1 0 −1 1 −1 −1 −1 1 1 1 1];

Option 3: PAR=4.1538 dB
[0 −1 −1 −1 −1 −1 1 −1 1 1 1 −1 −1 1 0 0 0 0 0 1 −1 −1 1 1 1 −1 1 −1 −1 −1 −1 −1]
[0 −1 1 −1 1 −1 −1 −1 −1 1 −1 −1 1 1 1 0 0 0 0 0 1 1 −1 −1 1 −1 −1 −1 −1 −1 1 −1 1 1 −1]
[0 1 −1 1 −1 1 1 1 1 −1 1 1 −1 −1 1 0 0 0 0 0 −1 −1 1 1 −1 1 1 1 1 1 −1 1 −1 −1 1 1]
[0 1 1 1 1 1 −1 1 −1 −1 −1 −1 1 1 1 −1 0 0 0 0 0 −1 1 1 1 −1 1 −1 1 1 1 −1 1 −1 −1 1 1 1 1 1 1];

Option 2: PAR=4.4236 dB
[0 −1 −1 −1 −1 1 −1 1 1 −1 1 1 1 −1 −1 −1 −1 1 1 1 1 −1 −1 −1 −1 1 0 0 0 0 0 0 0 0 0 0 0 −1 −1 −1 1 1 1 1 −1 −1 −1 −1 −1 −1 −1 1 1 −1 1 1 1 −1 1 1 −1 1 −1 −1 −1 −1 1]; and Option 1 (100 Data Sub-Carriers): PAR=5.0478 dB
[0 1 1 −1 −1 1 1 −1 1 1 1 1 −1 1 1 −1 1 −1 −1 −1 −1 −1 1 1 1 1 −1 −1 −1 1 −1 1 −1 −1 1 1 1 1 −1 −1 −1 1 −1 1 −1 −1 −1 −1 −1 −1 1 1 −1 −1 −1 −1 −1 1 1 1 −1 1 0 0 0 0 0 0 0 0 0 0 0 0 0 0 0 0 0 0 1 −1 1 1 1 −1 −1 −1 −1 1 −1 1 −1 −1 −1 1 1 1 1 −1 −1 1 −1 1 −1 −1 −1 1 1 1 1 −1 −1 −1 −1 −1 1 1 1 −1 1 1 1 −1 1 1 1 −1 −1 1 1 −1 1 1 −1 −1 1 1 −1 −1 1 1]

Option 1 (96 Data Sub-Carriers): PAR=5.2695 dB
[0 1 −1 −1 1 1 −1 −1 1 1 1 −1 1 1 1 1 −1 1 1 −1 1 −1 −1 −1 −1 −1 −1 1 1 1 1 1 1 −1 −1 1 −1 1 −1 1 1 1 −1 −1 −1 1 1 1 −1 1 −1 −1 1 1 −1 −1 −1 −1 −1 1 1 −1 −1 1 0 0 0 0 0 0 0 0 0 0 0 0 0 0 0 0 0 0 0 0 0 −1 −1 1 −1 −1 −1 1 1 −1 −1 1 −1 −1 −1 −1 1 1 1 −1 −1 −1 1 1 1 1 −1 −1 1 −1 −1 −1 −1 −1 1 −1 1 1 1 1 1 −1 1 1 1 −1 −1 1 1 −1 −1 1 1].

In at least one embodiment, a scaling factor is included to match the energy in the STF to the energy in the data symbols. For option 5, the STF can be scaled by sqrt(6/2) if there are 6 pilot+ data subcarriers used for the data OFDM symbols while two sub-carriers are used for STF. Alternatively, the sub-carriers are scaled down in the data OFDM symbols to match the energy in the STF. Some examples of STFs including scaling factors are:

STF_freq(Option-1)=sqrt(104/24)*[0,zeros(1,3),j,zeros(1, 3),−j, zeros(1,3),j,zeros(1,3),j,zeros(1,3),j,zeros(1,3),−j, zeros(1,3),j,zeros(1,3),−j, zeros(1,3),j,zeros(1,3),j,zeros (1,3),j,zeros(1,3),j,zeros(1,31),−j,zeros(1,3),−j,zeros(1, 3),−j, zeros(1,3),−j,zeros(1,3),j,zeros(1,3),−j,zeros(1,3),j, zeros(1,3),−j,zeros(1,3),−j, zeros(1,3),j,zeros(1,3),j,zeros (1,3),−j,zeros(1,3)];

STF_freq(Option-2)=sqrt(52/12)*[0,zeros(1,3),−1,zeros(1, 3),−j, zeros(1,3),1,zeros(1,3),j,zeros(1,3),1,zeros(1,3),−j, zeros(1,15),j,zeros(1,3),1,zeros(1,3),−j, zeros(1,3),1,zeros(1,3),j,zeros(1,3),−1,zeros(1,3)];

STF_freq(Option-3)=sqrt(26/6)*[0,zeros(1,3),−j,zeros(1, 3),−1,zeros(1,3),−j, zeros(1,3),0,zeros(1,3),j,zeros(1,3),−1,zeros(1,3), j,zeros(1,3)];

STF_freq(Option-4)=sqrt(14/6)*[0, 0,−j,0,−1,0,−j,0,0,0,j, 0,−1,0,j,0]; and

STF_freq(Option-5)=sqrt(6/2)*[0,0,−j,0,0,0,j,0].

These sequences are given in Matlab format. For Option 5, the first 0 represents the DC tone, which is not used. The next three subcarriers are 1, 2, and 3. In general, if there are N subcarriers, the Matlab subcarrier numbering is 0, 1, 2, 3, . . . , (N/2)−1 followed by −(N/2), . . . , −3, −2, −1. Some examples of LTFs are:

LTF_freq(Option-1)=[0, 1,−1,−1, 1, 1,−1,−1, 1, 1,−1, 1, 1, 1, 1,−1, 1,−1,−1,−1,−1,−1, 1, 1, 1, 1, 1,−1,−1, 1,−1, 1, 1, 1, 1,−1,−1,−1, 1, 1,−1,−1,−1, 1,−1,−1,−1,−1, 1,−1,−1, zeros(1,23), −1,−1, 1,−1,−1,−1,−1, 1,−1,−1,−1,−1, 1, 1,−1,−1,−1, 1, 1, 1,−1, 1,−1, 1, 1, 1, 1, 1,−1,−1,− 1,−1,−1,−1, 1,−1, 1, 1, 1, 1, 1,−1, 1, 1, 1, 1,−1,−1, 1];

LTF_freq(Option-2)=[0,−1,−1,−1,−1, 1,−1, 1,−1, 1, 1,−1, 1, 1,−1,−1, 1,−1,−1,−1, 1, 1, 1,−1,−1 −1,−1, zeros(1,11),− 1,−1,−1,−1, 1, 1, 1,−1,−1,−1, 1,−1,−1, 1, 1,−1, 1, 1,−1, 1,−1, 1,−1,−1,−1,−1];

LTF_freq(Option-3)=[0,−1,−1,−1,−1,−1, 1,−1, 1, 1, 1,−1,−1, 1, zeros(1,5), 1,−1,−1, 1, 1, 1,−1, 1,−1, −1,1,−1,−1];

LTF_freq(Option-4)=[0,−1,−1,−1,1,1,−1,1,zeros(1,1),1,−1, 1,1,−1,−1,−1]; and

LTF_freq(Option-5)=[0,−1,−1,1, zeros(1,1),1,−1,−1].

An alternative example of a LTF using 100 data subcarriers is:

LTF_freq(Option-1 alternative)=[0, 1, 1,−1,−1, 1, 1,−1, 1, 1, 1,−1, 1, 1,−1, 1,−1, 1,−1,−1,−1,−1,−1, 1, 1, 1,−1,−1,−1,−1,− 1,−1, 1,−1,−1, 1, 1, 1, 1,−1,−1,−1, 1,−1, 1,−1,−1,−1,−1,−1,−1,− 1,−1, 1, 1,−1, 1, zeros(1,19), 1,−1, 1, 1,−1,−1,−1,−1, 1,−1,−1,−1, 1,−1,−1,−1, 1, 1, 1, 1,−1,−1, 1,−1, 1,−1,−1,−1,
1, 1, 1, 1,−1,−1,−1,−1,−1, 1,−1, 1,−1, 1, 1,−1, 1, 1, 1,−1,
1, 1,−1,−1, 1, 1].

Figure 6:
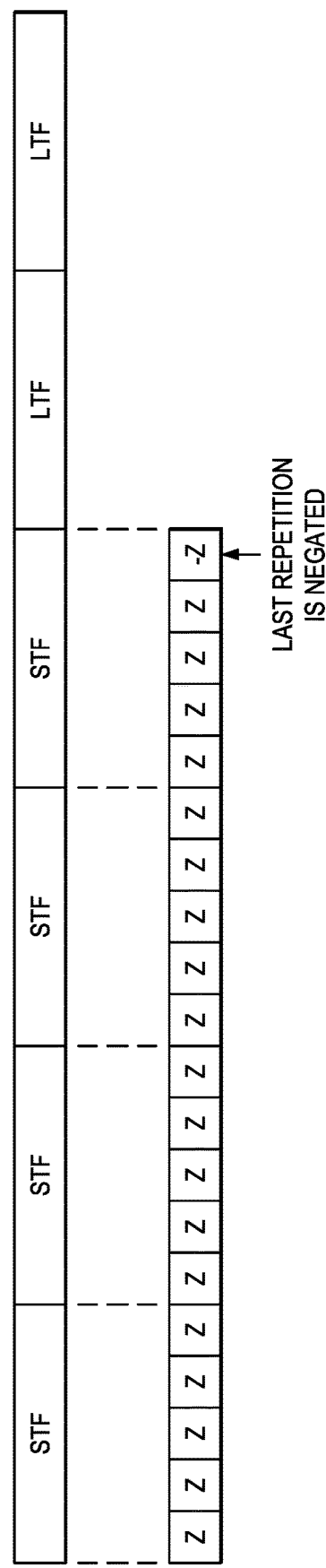
FIG. 6 illustrates negation of last STF to enable boundary detection in accordance with various embodiments.

In some embodiments, the preamble can be constructed to enable efficient boundary detection of the start of the OFDM packet. For example, FIG. 6 shows that a negation is applied for the last repetition in the STF. In at least one embodiment, the last repetition of a group of bits in the final STF is negated at the transmitter, and the receiver can use this information to determine when the sign change takes place so that the end of the STF can be determined accurately. Specifically, the output of a correlator shows a characteristic pattern at the boundary of the STF and LTF. In various embodiments, the last 2, 3, or N repetitions are negated. When cross-correlation is used (correlating against a known sequence), the transition that occurs from z to −z can be found by monitoring for a phase change of 180 degrees (in the noiseless case) in the correlator output. In FIG. 6, the "z" represents one group of bits repeated in the STF, which is itself repeated. In another embodiment, the entire final repeated STF is negated. In other embodiments, the size of the bits that are negated varies. Returning to FIG. 6, there are two OFDM symbols because the cyclic prefix is ¼ of the useful part of the OFDM symbol, and there is a repetition of 4 within the OFDM symbol due to the structure of the STF. Because the time-domain representation of the STF is real, any negative time-domain values for the last repetition are changed to positive and any positive time-domain values are changed to negative. In another embodiment the STF is complex, so the both the real and imaginary parts are negated for the last repetition within the last STF.

Figure 7:
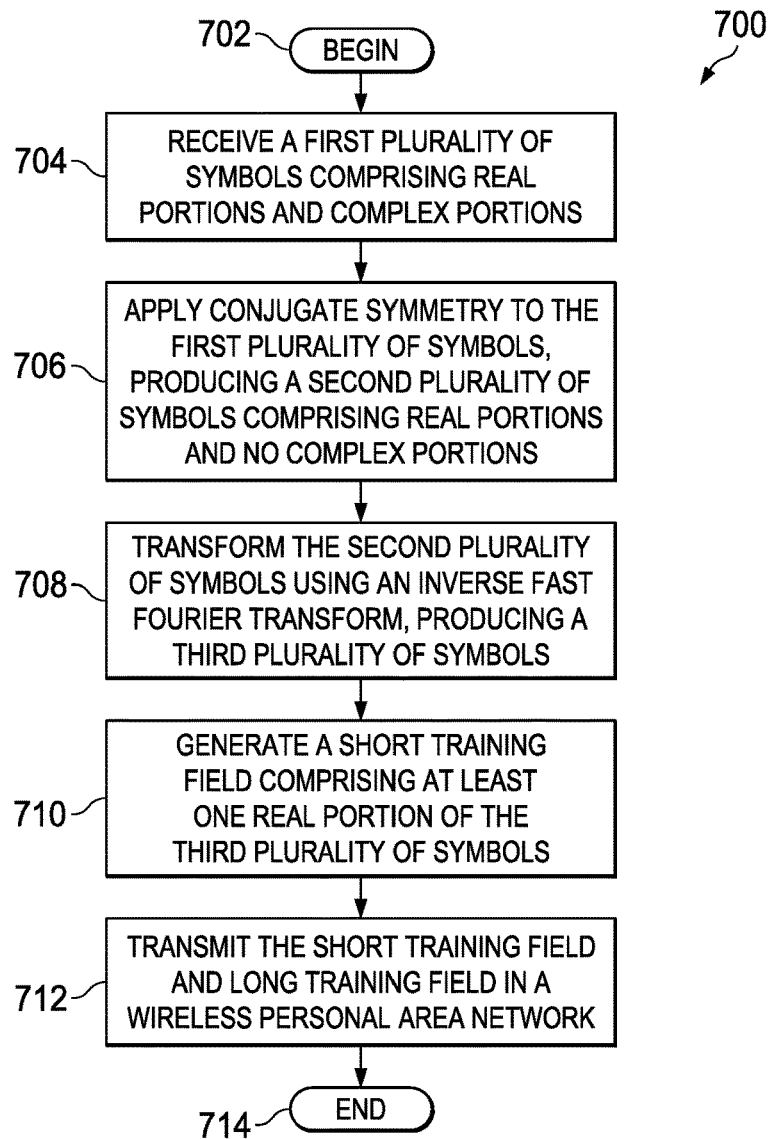
FIG. 7 illustrates a method of generating STFs and LTFs in accordance with various embodiments.

FIG. 7 illustrates a method of generating STFs and LTFs beginning at 702 and ending at 714. While at least one embodiment is illustrated, the method 700 can comprise any step described above in various embodiments. At 704, a first plurality of symbols comprising real portions and complex portions is received. At 706, conjugate symmetry is applied to the first plurality of symbols, thus producing a second plurality of symbols comprising real portions and no complex portions. At 708, the second plurality of symbols is transformed using an inverse fast Fourier transform, thus producing a third plurality of symbols. In at least one embodiment, the second plurality of symbols is interpolated. At 710, a short training field is generated comprising at least one real portion of the third plurality of symbols. At 712, a long training field is generated comprising at least one real portion of the third plurality of symbols. At 714, the short training field and long training field are transmitted in a wireless personal area network. In at least one embodiment, power is reduced to logic responsible for complex symbol processing. A final repetition of a group of bits is negated in at least one embodiment. Preferably, the last portion of the STF is negated. In an alternative embodiment the block 706 is omitted so that the STF and LTF are complex.

Figure 8:
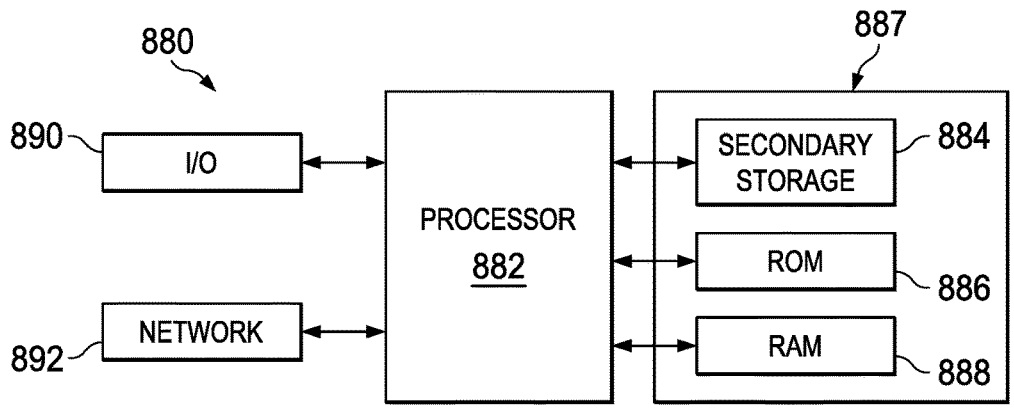
FIG. 8 illustrates a particular machine suitable for implementing one or more embodiments described herein.

The system described above may be implemented on a particular machine with sufficient processing power, memory resources, and network throughput capability to handle the necessary workload placed upon it. FIG. 8 illustrates a particular machine 880 suitable for implementing one or more embodiments disclosed herein. The computer system 880 includes one or more processors 882 (which may be referred to as a central processor unit or CPU) that is in communication with a machine-readable medium 887. The machine-readable medium 887 may comprise memory devices including secondary storage 884, read only memory (ROM) 886, and random access memory (RAM) 888. The processor is further in communication with input/output (I/O) 890 devices and network connectivity devices 892. The processor may be implemented as one or more CPU chips.

The secondary storage 884 is typically comprised of one or more disk drives, tape drives, or optical discs and is used for non-volatile storage of data and as an over-flow data storage device if RAM 888 is not large enough to hold all working data. Secondary storage 884 may be used to store programs and instructions 889 that are loaded into RAM 888 when such programs are selected for execution. The ROM 886 is used to store instructions 889 and perhaps data, which are read during program execution. ROM 886 is a non-volatile memory device that typically has a small memory capacity relative to the larger memory capacity of secondary storage. The RAM 888 is used to store volatile data and perhaps to store instructions 889. Access to both ROM 886 and RAM 888 is typically faster than to secondary storage 884.

I/O 890 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 892 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 892 devices may enable the processor 882 to communicate with an Internet or one or more intranets. With such a network connection, the processor 882 may receive information from the network, or may output information to the network in the course of performing the above-described method steps. Such information, which is often represented as a sequence of instructions 889 to be executed using processor 882, may be received from and output to the network, for example, in the form of a computer data signal embodied in a carrier wave Such information, which may include data or instructions 889 to be executed using processor 882 for example, may be received from and output to the network, for example, in the form of a computer data baseband signal or signal embodied in a carrier wave. The baseband signal or signal embodied in the carrier wave generated by the network connectivity 892 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 882 executes instructions 889, codes, computer programs, scripts which it accesses from hard disk, floppy disk, optical disc (these various disk based systems may all be considered secondary storage 884), ROM 886, RAM 888, or the network connectivity devices 892.

In an alternative embodiment the system may be implemented in an application specific integrated circuit ("ASIC") comprising logic configured to perform any action described in this disclosure with corresponding and appropriate inputs and outputs or a digital signal processor ("DSP").

The above disclosure is meant to be illustrative of the principles and various embodiment of the present invention. Numerous variations and modifications will become apparent to those skilled in the art once the above disclosure is fully appreciated. Additionally, audio or visual alerts may be triggered upon successful completion of any action described herein, upon unsuccessful actions described herein, and upon errors. Also, the order of the actions shown in FIG. 7 can be varied from order shown, and two or more of the actions may be performed concurrently. It is intended that the following claims be interpreted to embrace all variations and modifications.

What is claimed is:

1. A communication device comprising:
   a transmit circuitry;
   a receive circuitry;
   an antenna coupled to the transmit circuitry and to the receive circuitry, the receive circuitry configured to receive, using the antenna, a first packet having first data symbols;
   a processor that includes:
      a first set of circuitry configured to process real symbols; and
      a second set of circuitry configured to process complex symbols; and
   a non-transitory machine-readable storage medium comprising executable instructions that, when executed, cause the processor to:
      generate, based on the first data symbols, second data symbols comprising no complex portions;
      generate, using the first set of circuitry of the processor and without using the second set of circuitry of the processor, a synchronization header based on the second data symbols, wherein the synchronization header includes a short training field (STF) and a long training field (LTF), wherein the STF and the LTF are arranged directly adjacent to one another within the synchronization header;
      generate a second packet that includes the synchronization header, a packet header, and a packet payload; and
      cause the transmit circuitry to transmit the second packet over a network using the antenna.

2. The communication device of claim 1, wherein the LTF includes a real portion of a time domain sequence corresponding to the first packet.

3. The communication device of claim 2, wherein the time domain sequence is produced by performing an inverse Fourier transform on a frequency domain signal corresponding to the first packet.

4. The communication device of claim 1, wherein the STF, when represented in a frequency domain, includes the values [0, 0, −1, 0, −1, 0, 0, 1, 0, 1, 0, 1, 0] for tones [0, 1, 2, 3, 4, 5, 6, 7, −8, −7, −6, −5, −4, −3, −2, −1], respectively, and the values of 1 and −1 are adjustable based on a scaling factor.

5. The communication device of claim 4, wherein the scaling factor is sqrt(14/6).

6. The communication device of claim 1, wherein the STF, when represented in a frequency domain, includes the values [0, 0, 0, 0, −1, 0, 0, 0, 1, 0, 0, 0, −1, 0, 0, 0, 0, 0, 0, 1, 0, 0, 0, 1, 0, 0, 0] for tones [0, 1, 2, 3, 4, 5, 6, 7, 8, 9, 10, 11, 12, 13, 14, 15, −16, −15, −14, −13, −12, −11, −10, −9, −8, −7, −6, −5, −4, −3, −2, −1], respectively, and the values of 1 and −1 are adjustable based on a scaling factor.

7. The communication device of claim 6, wherein the scaling factor is sqrt(26/6).

8. The communication device of claim 1, wherein the STF, when represented in a frequency domain, includes the values [0, 0, 0, 0, 1, 0, 0, 0, −1, 0, 0, 0, 1, 0, 0, 0, 1, 0, 0, 0, −1, 0, 0, 0, 1, 0, 0, 0, 0, 0, 0, 0, 0, 0, 0, 0, 0, 0, 0, 0, −1, 0, 0, 0, −1, 0, 0, 0, −1, 0, 0, 0, 1, 0, 0, 0, 1, 0, 0, 0, 1, 0, 0, 0] for tones [0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, −32, −31, −30, −29, −28, −27, −26, −25, −24, −23, −22, −21, −20, −19, −18, −17, −16, −15, −14, −13, −12, −11, −10, −9, −8, −7, −6, −5, −4, −3, −2, −1], respectively, and the values of 1 and −1 are adjustable based on a scaling factor.

9. The communication device of claim 8, wherein the scaling factor is sqrt(52/12).

10. The communication device of claim 1, wherein the STF, when represented in a frequency domain, includes the values [0, 0, 0, 0, 0, 0, 0, 0, 1, 0, 0, 0, 0, 0, 0, 0, −1, 0, 0, 0, 0, 0, 0, 0, 1, 0, 0, 0, 0, 0, 0, 0, 1, 0, 0, 0, 0, 0, 0, 0, −1, 0, 0, 0, 0, 0, 0, 0, 1, 0, 0, 0, 0, 0, 0, 0, 0, 0, 0, 0, 0, 0, 0, 0, 0, 0, 0, 0, 0, 0, 0, 0, 0, 0, 0, 0, −1, 0, 0, 0, 0, 0, 0, 0, −1, 0, 0, 0, 0, 0, 0, 0, −1, 0, 0, 0, 0, 0, 0, 0, 1, 0, 0, 0, 0, 0, 0, 0, 1, 0, 0, 0, 0, 0, 0, 0, 0] for tones [0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, −64, −63, −62, −61, −60, −59, −58, −57, −56, −55, −54, −53, −52, −51, −50, −49, −48, −47, −46, −45, −44, −43, −42, −41, −40, −39, −38, −37, −36, −35, −34, −33, −32, −31, −30, −29, −28, −27, −26, −25, −24, −23, −22, −21, −20, −19, −18, −17, −16, −15, −14, −13, −12, −11, −10, −9, −8, −7, −6, −5, −4, −3, −2, −1], respectively, and the values of 1 and −1 are adjustable based on a scaling factor.

11. The communication device of claim 10, wherein the scaling factor is sqrt(104/12).

12. The communication device of claim 1, wherein the LTF, when represented in a frequency domain, includes the values [0, −1, 1, 1, 1, −1, −1, −1, 0, 1, −1, 1, 1, −1, 1, 1] for tones [0, 1, 2, 3, 4, 5, 6, 7, −8, −7, −6, −5, −4, −3, −2, −1], respectively.

13. The communication device of claim 1, wherein the LTF, when represented in a frequency domain, includes the values: [0, −1, −1, 1, −1, 1, 1, −1, −1, 1, 1, −1, −1, 1, 0, 0, 0, 0, 0, 1, −1, 1, −1, 1, 1, 1, 1, 1, 1, 1, −1] for tones [0, 1, 2, 3, 4, 5, 6, 7, 8, 9, 10, 11, 12, 13, 14, 15, −16, −15, −14, −13, −12, −11, −10, −9, −8, −7, −6, −5, −4, −3, −2, −1], respectively.

14. The communication device of claim 1, wherein the LTF, when represented in a frequency domain, includes the values [0, 1, −1, 1, 1, −1, 1, −1, −1, 1, −1, 1, 1, −1, −1, 1, 1, −1, −1, −1, −1, −1, 1, −1, −1, −1, 1, 0, 0, 0, 0, 0, 0, 0, 0, 0, 0, −1, −1, −1, −1, 1, 1, 1, −1, 1, −1, 1, −1, 1, 1, −1, −1, −1, 1, 1, −1, 1, 1, 1, −1, −1, −1] for tones [0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, −32, −31, −30, −29, −28, −27, −26, −25, −24, −23, −22, −21, −20, −19, −18, −17, −16, −15, −14, −13, −12, −11, −10, −9, −8, −7, −6, −5, −4, −3, −2, −1], respectively.

15. The communication device of claim 1, wherein the LTF, when represented in a frequency domain, includes the values [0, 1, −1, 1, −1, 1, 1, −1, −1, 1, −1, 1, 1, 1, 1, −1, 1, 1, 1, 1, 1, −1, 1, −1, −1, 1, −1, 1, 1, −1, 1, −1, −1, −1, 1, 1, 1, 1, −1, −1, −1, −1, −1, −1, 1, −1, 1, 1, −1, 1, 0, 0, 0, 0, 0, 0, 0, 0, 0, 0, 0, 0, 0, 0, 0, 0, 0, 0, 0, 0, 0, 0, −1, 1, 1, −1, −1, −1, −1, 1, 1, −1, −1, 1, 1, 1, −1, −1, 1, 1, −1, −1, −1, −1, 1, 1, −1, −1, −1, −1, −1, 1, 1, −1, 1, −1, −1, 1, −1, 1, 1, 1, 1, −1, −1, 1, 1, −1, 1, 1, −1, 1, 1] for tones [0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, −64, −63, −62, −61, −60, −59, −58, −57, −56, −55, −54, −53, −52, −51, −50, −49, −48, −47, −46, −45, −44, −43, −42, −41, −40, −39, −38, −37, −36, −35, −34, −33, −32, −31, −30, −29, −28, −27, −26, −25, −24, −23, −22, −21, −20, −19, −18, −17, −16, −15, −14, −13, −12, −11, −10, −9, −8, −7, −6, −5, −4, −3, −2, −1], respectively.

16. The communications device of claim 1, wherein the instructions are such that the second set of circuitry is off during the generating of the synchronization header.

17. A method comprising:
receiving a first set of data symbols;
generating a second set of data symbols based on the first set of data symbols such that the second set of data symbols does not include complex symbols;
generating, by using a first set of circuitry of a processor, a header that includes a short training field and a long training field based on the symbols of the second set of data symbols, wherein the short training field and the long training field are directly adjacent to one another, and wherein the short training field comprises a group of bits that are repeated, and wherein a last group of bits of the short training field are negated;
generating a packet that includes the header and a packet payload; and
transmitting the packet over a network.

18. The method of claim 17, wherein the header is a synchronization header and the packet includes a packet header.

19. The method of claim 17, wherein the header includes more than one short training field and more than one long training field.

20. The method of claom 17, wherein the short training field comprises a lower number of non-zero tones compared to the long training field.

21. The method of claim 17, further comprising receiving, by a receiver, the packet.

22. The method of claim 17, wherein the first set of circuitry processes real symbols, and wherein generating the header comprises generating the header without using a second set of circuitry of the processor that processes complex symbols.

23. The method of claim 22, wherein the second set of circuitry is off during the generating of the header.

24. The method of claim 17, wherein the short training field comprises two symbols and the long training field comprises four symbols.

25. The method of claim 17, further comprising:
receiving, by a receiver, the packet; and
determining an end of the short training field in the received packet based on the last group of bits of the short training field that are negated.

\* \* \* \* \*